June 22, 1948.    R. L. RINGER, JR    2,443,777
RESISTANCE WELDING CIRCUIT
Filed Feb. 3, 1945
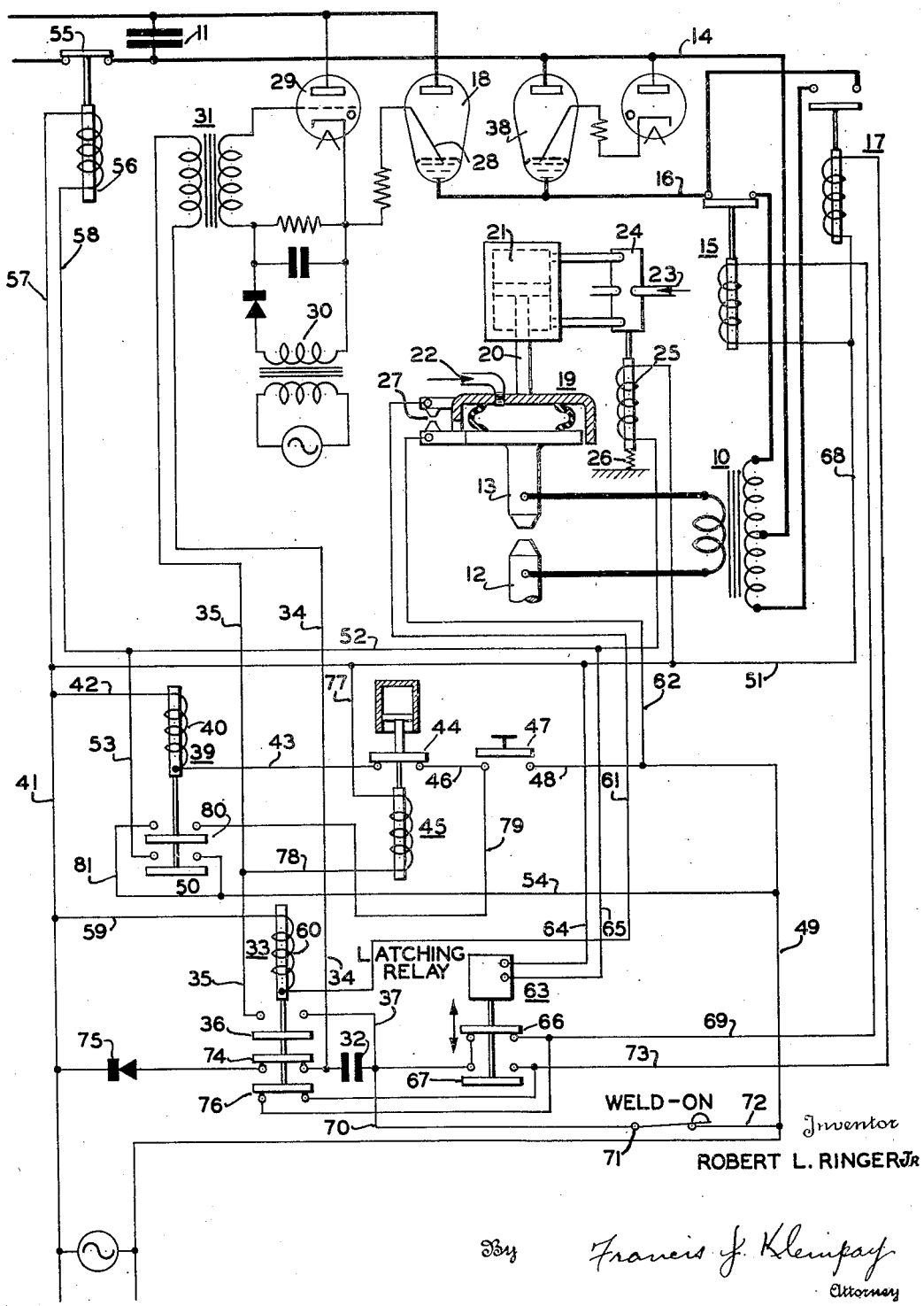
Inventor
ROBERT L. RINGER Jr
By Francis J. Klempay
Attorney Patented June 22, 1948

2,443,777

UNITED STATES PATENT OFFICE 2,443,777

RESISTANCE WELDING CIRCUIT

Robert Lee Ringer, Jr., Jersey City, N. J., assignor to The Taylor-Winfield Corporation, Warren, Ohio, a corporation of Ohio Application February 3, 1945, Serial No. 576,036

4 Claims. (Cl. 219—4)

This invention relates to electric resistance welding apparatus and particularly to such apparatus of the spot welding type in which an electrode is moved into and out of engagement with the work in each succeeding cycle of operation. In the operation of certain spot welding machines of this character, particularly those employing the unidirectional discharge of a capacitance for furnishing the welding energy and a transformer for translating the energy to the welding load, arcing normally occurs between the work and the opening electrode due to the remnant magnetic flux existent in the transformer; the arcing is more severe, the more rapid the operation of the machine, since then the time intervals between the cessations of flow of primary current and the disengagements of the electrode from the work are materially shorter. Since this arcing is deleterious both to the work and to the electrodes it is to be avoided and heretofore various means for preventing it have been proposed. It is the primary object of the present invention to provide improved and substantially simplified welding transformer circuit arrangements whereby arcing at the welding electrode tips upon opening of the tips is prevented irrespective of the unidirectional character of the current furnished the primary winding of the transformer in effecting the weld.

A further and more specific object of the invention is the provision of an improved and simplified spot welding transformer circuit adapted to receive surges of unidirectional current in effecting successive welds which is operative through the use of the same circuit controlling devices both to reverse the flow of current through the transformer in succeeding cycles of operation whereby magnetic saturation of the core of the transformer is avoided and to prevent arcing at the electrode tips upon retraction of the tips following completion of the respective welding cycles.

The above and other objects and advantages of the invention will become apparent upon consideration of the following detailed specification and the accompanying drawing wherein there is disclosed a preferred embodiment of the invention.

The single figure of the drawing is a schematic representation of a spot welding system of the capacitor discharge type constructed in accordance with the principles of the invention. Referring to the drawing, reference numeral 10 designates a welding transformer adapted to be energized by the discharge of a large capacitance 11 and having a secondary connected directly with the welding electrodes 12 and 13, the former of which is normally fixed while the latter is mounted for movement toward and away from the former as is customary in electric resistance spot welders. To facilitate the discharge of the capacitance 11 through the primary winding of the transformer 10 in opposite directions in succeeding cycles of operation this primary winding is provided with a center-tap which is connected with the negative terminal of capacitance 11 through conductor 14. The end terminals of the primary winding are arranged to be alternately connected with the positive terminal of the capacitance 11 and for this purpose a magnetic contactor 15 is adapted to connect one end terminal of the primary winding with a common conductor 16 while a similar contactor 17 is arranged to connect the opposite end terminal of the winding with the common conductor 16. Interposed between the positive terminal of capacitance 11 and conductor 16 is a circuit controlling device preferably an ignitron 18 having its anode electrically connected to the positive terminal of the capacitance and its mercury pool cathode electrically connected with conductor 16.

Electrode 13 is shown as being carried by one end wall of a flexible bellows 19 the other end wall of which is in turn carried by a rod 20 attached to a piston within cylinder 21. Air under predetermined pressure is supplied to the bellows 19 through inlet 22 and a conduit 23 supplies operating air to the cylinder 21 under the control of a four-way valve 24 which is arranged to be operated in one direction by a solenoid 25 and in the opposite direction by a spring 26. The arrangement here is such that upon energization of solenoid 25 air is admitted to the top of cylinder 21 to move bellows 19 and electrode 13 downwardly. Upon de-energization of solenoid 25 spring 26 reverses valve 24 to retract bellows 19 and electrode 13. Upon downward movement of rod 20 and following the clamping engagement of electrode 13 with the work, bellows 19 begins to collapse and during such collapsing a switch 27 carried thereby closes to initiate discharge of capacitance 11 thus applying the welding current to the electrodes synchronously with the application of predetermined welding force as controlled by the pressure of the air furnished the inlet 22.

Ignitron 18 is provided with an ignition electrode 28 arranged to be energized upon conduction in an electron discharge device 29 which, in accordance with usual practice, is of the grid-controlled gas filled type. A grid controlling circuit for tube 29 is provided as shown and includes a potential source 30 for holding the tube 29 normally non-conducting. The grid-controlling circuit also includes a secondary winding of an impulse transformer 31 the primary winding of which is arranged to be energized, in proper timed sequence, by the discharge of a capacitance 32 upon energization of a relay 33, this energizing circuit being traceable from the left terminal of capacitance 32 through conductor 34, primary winding of transformer 31, conductor 35, contact 36 of relay 33, and conductor 37 to the opposite terminal of capacitance 32. Connected across the conductors 14 and 16 is an ignitron 38 which becomes conductive upon reversal of polarity in either of the sections of the primary winding of the transformer 10 immediately following the initial discharge of capacitance 11 to provide a uni-directional low resistance shunt path with respect to either of the winding sections to prevent the inverse charging of capacitance 11.

I provide a control relay 39 having an operating solenoid 40 which is in a circuit extending from one control power line conductor 41 through conductors 42 and 43, normally closed contact 44 of a time delay relay 45, conductor 46, manually operated switch 47, and conductor 48 to the opposite line conductor 49. Thus, upon closure of switch 47 solenoid 40 is energized and upon such energization its armature closes contact 50 which energizes solenoid 25 through the circuit-line conductor 41, conductor 51, solenoid 25, conductors 52 and 53, contact 50, and conductor 54 to line conductor 49. Simultaneously the charging circuit for capacitance 11 is interrupted by the opening of a normally closed contact 55 positioned in such circuit, the contact 55 being opened upon energization of an operating solenoid 56 through the circuit-line conductor 41, conductor 57, solenoid 56, conductors 58 and 53, contact 50, and conductor 54 to line conductor 49. As explained above, energization of solenoid 25 results in downward movement of the rod 20 and upon the electrode 13 engaging the work with sufficient pressure to cause collapse of bellows 19 switch 27 closes to energize relay 33 through the circuit-line conductor 41, conductor 59, operating solenoid 60 of relay 33, conductor 61, switch 27, and conductor 62 to line conductor 49. At all times either one or the other of the magnetic switches 15 and 17 is closed so that upon actuation of relay 33 and the consequent discharging of capacitance 32 through the impulse transformer 31 the ignitron 18 is rendered conducting to discharge capacitance 11 through one or the other of the primary winding sections of the welding transformer 10.

Magnetic switches 15 and 17 are alternatively energized by a reversing relay of the latching type shown schematically at 63. This relay is simultaneously actuated with the solenoid 25 through conductor 64 connected with conductor 51 and conductor 65 connected with conductor 52. Upon each energization its armature is moved in one direction or the other and latched in its stopping position. To this armature is attached a contact 66 which is closed upon one energization of relay 63 and a second contact 67 which is closed upon the next succeeding energization when contact 66 opens. The operating solenoid for switch 15 is in a circuit which may be traced from line conductor 41 through conductor 51, conductor 68, said solenoid, conductor 69, contact 66, conductor 70, normally closed switch 71, and conductor 72 to line conductor 49. The energizing circuit for the operating solenoid for switch 17 includes conductors 68 and 73, contact 67 of relay 63 and conductor 70.

Relay 33 is provided with a back contact 74 which connects a rectifier 75 in series with the capacitance 32 across the line 41, 49 during the time that relay 33 is deenergized to charge capacitance 32 between each successive welding cycle. Relay 33 is provided with a second back contact 76 which, when relay 33 is de-energized, interconnects conductors 69 and 73 whereby both the switches 15 and 17 are energized (closed), the electrical connection between both the solenoids of these switches and the line conductor 49 being then effected through the particular contact 66 or 67 which is then in closed position. Thus the primary winding of the welding transformer 10 is short-circuited during the time that relay 33 is de-energized. However, during the making of the weld, which can only be accomplished when relay 33 is energized, but one of the switches 15 and 17 is closed as explained above.

The solenoid energizing circuit for the time delay relay 45 may be traced from line conductor 41 through conductor 51, a conductor 77, the solenoid of the relay, conductors 78 and 35, contact 36 of relay 33, conductors 37 and 70, switch 71, and conductor 72 to line conductor 49. Thus relay 45 is energized upon energization of relay 33 and following the timing out of its period the contact 44 opens to interrupt the energization of relay 39. I provide a hold circuit in parallel with the switch 47 comprising a conductor 79 leading from conductor 46, a normally open contact 80 on the relay 39, and a conductor 81 connecting with the conductor 54 which leads to the line conductor 49 on the opposite side of the switch 47. Thus upon the momentary closing of the switch 47 relay 39 is held in and can only be de-energized by opening the contact 44.

At the start of a cycle of operation the capacitances 11 and 32 are fully charged, contact 55 is closed, both the switches 15 and 17 are closed, and solenoid 25 is de-energized resulting in the rod 20 being in retracted position and the switch 27 being open. Upon insertion of the work between the electrodes 12 and 13 and the subsequent closing of the switch 47 relay 39 operates to energize solenoids 25 and 56 and latching relay 63, thus closing the electrodes onto the work, opening the contact 55, and reversing the contacts of latching relay 63. Upon proper welding force being applied by the electrode 13 switch 27 closes to energize relay 33 which operates first to disconnect rectifier 75 and to interrupt the interconnection between conductors 69 and 73 thus dropping out one or the other of the switches 15 and 17. Continued movement of the armature of the relay 33 closes contact 36 thereof which discharges capacitance 32 through transformer 31 thereby initiating conduction in tube 29 which fires tube 18. The principal welding power capacitance 11 is now discharged through one or the other of the sections of the primary winding of transformer 10 and upon reversal of the current in this discharge circuit due to the inductive effect of the transformer the ignitron 38 begins to conduct as explained above. Closure of contact 36 also energizes relay 45 and after a predetermined delay sufficiently long to enable the welding cycle to be completed contact 44 of relay 45 opens to de-energize solenoid 40 of relay 39. Upon the dropping out of relay 39 solenoids 25 and 56 are de-energized and rod 20 begins to move upwardly and the first effect of such upward movement is the opening of switch 27 which de-energizes relay 33. Conductors 69 and 73 are thereupon immediately again interconnected and both the switches 15 and 17 closed to short circuit the primary of the transformer 10. In this manner I provide a simple, reliable and efficient arrangement for insuring the short-circuiting of the transformer 10 at a time immediately prior to and during the disengagement of the electrode 13 from the welded work, it being understood that continued upward movement of the rod 20 following the opening of the switch 27 causes the electrode 13 to rise from the work. Since a winding of the welding transformer is short-circuited at the time the electrode is separated from the work any current which may flow as a result of the remanent magnetic flux in the transformer will flow through the short-circuited winding and not through the higher resistance path of the opening electrodes and in this manner arcing at the tips of the electrodes is wholly prevented.

The invention described herein is of especial utility in automatic welding equipment of the repeating type and it should be clear that, if desired, a suitable "off-time" timer and other necessary devices may be readily added to the circuit illustrated to effect such mode of operation. Since such repeating circuits form no part of the present invention the same are omitted from the present description and drawing.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In electric resistance spot welding apparatus adapted to be energized from a source of unidirectional current and having a welding transformer, a welding electrode, and means to move said electrode into and out of engagement with the work being welded; the combination of a center tap for the primary winding of said transformer electrically connected with one terminal of said source, a conductor adapted to be electrically connected with the other terminal of said source, a pair of switches interposed between said conductor and the opposite end terminals of said winding, means to close said switches alternately in successive welding cycles whereby said transformer is energized in opposite directions in successive welding cycles, and means operative in each cycle of operation following completion of the flow of welding current to close both said switches prior to the retracting movement of said electrode whereby said primary winding is short circuited at the time of disengagement of said electrode from said work.

2. In electric resistance spot welding apparatus adapted to be energized from a source of unidirectional current and having a welding transformer, a welding electrode, and means to move said electrode into and out of engagement with the work being welded; the combination of a pair of primary winding sections for said transformer, means electrically connecting one terminal of said source with one terminal of each of said sections, a conductor adapted to be electrically connected with the other terminal of said source, a pair of switches interposed between said conductor and the opposite end terminals of said sections, means to close said switches alternately in successive welding cycles whereby said transformer is energized in opposite directions in successive welding cycles, and means operative in each cycle of operation following completion of the welding cycle thereof to close both said switches prior to the retracting movement of said electrode whereby said primary winding is short circuited at the time of disengagement of said electrode from said work.

3. In electric resistance spot welding apparatus adapted to be energized from a source of unidirectional current and having a welding transformer, a welding electrode, and means to move said electrode into and out of engagement with the work being welded; the combination of a pair of primary winding sections for said transformer each having an end terminal connected with one of the terminals of said source, means to connect the opposite end terminals of said sections to the opposite terminal of said source alternately in successive cycles of operation whereby said transformer is energized in opposite directions in successive welding cycles, and means to electrically interconnect said opposite end terminals of said winding sections and to move said electrode away from the work in sequence whereby said primary winding is short circuited at the time of disengagement of said electrode from said work.

4. In electric resistance spot welding apparatus adapted to be energized from a source of unidirectional current and having a welding transformer provided with a pair of oppositely wound primary winding sections, a welding electrode, and means to move said electrode into and out of engagement with the work being welded; the combination of means to connect one terminal of each of said sections with one terminal of said source, means to connect the opposite terminal of said source alternately with the opposite end terminals of said sections in each successive welding operation, and means operable synchronously with said means to move said electrode out of engagement with the work to electrically interconnect said opposite end terminals of said sections whereby said primary winding is short circuited during disengagement of said electrode from the welded work.

ROBERT LEE RINGER, JR.

REFERENCES CITED

The following references are of record in the file of this patent:

UNITED STATES PATENTS

| Number | Name | Date |
|---|---|---|
| 2,294,671 | Livingston | Sept. 1, 1942 |
| 2,295,293 | Rogers | Sept. 8, 1942 |
| 2,302,119 | Hagedorn | Nov. 17, 1942 |
| 2,315,093 | Languepin | Mar. 30, 1943 |